United States Patent [19]

Moriyasu

[11] Patent Number: 4,703,443
[45] Date of Patent: Oct. 27, 1987

[54] DEVICE FOR MEASURING THE SHAPE OF A THREE-DIMENSIONAL OBJECT

[75] Inventor: Takashi Moriyasu, Yokohama, Japan

[73] Assignee: Kabushiki Kaisha Toshiba, Kawasaki, Japan

[21] Appl. No.: 699,133

[22] Filed: Feb. 7, 1985

[30] Foreign Application Priority Data

Feb. 16, 1984 [JP] Japan .................................. 59-27424

[51] Int. Cl.[4] ........................... G01B 3/14; G01B 5/24
[52] U.S. Cl. .................................... 364/559; 33/1 N; 33/503; 364/168; 364/560
[58] Field of Search ............... 364/168, 518, 522, 559, 364/513, 569, 474; 33/1 M, 1 N, 169 R, 503; 901/10, 14, 15

[56] References Cited

U.S. PATENT DOCUMENTS

| | | | |
|---|---|---|---|
| 3,940,854 | 3/1976 | Maxey | 33/503 |
| 3,944,798 | 3/1976 | Eaton | 364/559 |
| 4,026,031 | 5/1977 | Siddall et al. | 364/560 X |
| 4,240,205 | 12/1980 | Tuss | 33/1 M |
| 4,381,608 | 5/1983 | Thormann et al. | 33/1 M |
| 4,430,796 | 2/1984 | Nakagawa | 33/1 M |
| 4,464,839 | 8/1984 | Sadeh | 33/1 M |
| 4,467,436 | 8/1984 | Chance et al. | 364/513 |
| 4,477,973 | 10/1984 | Davies | 33/1 M X |
| 4,543,639 | 9/1985 | Inaba et al. | 364/513 |
| 4,558,420 | 12/1985 | Gerber | 364/474 |
| 4,558,977 | 12/1985 | Inoue et al. | 364/474 |

FOREIGN PATENT DOCUMENTS

| | | |
|---|---|---|
| 2515944 | 10/1975 | Fed. Rep. of Germany . |
| 55-55210 | 4/1980 | Japan . |
| 58-14006 | 1/1983 | Japan . |
| 81/01334 | 3/1981 | PCT Int'l Appl. . |

OTHER PUBLICATIONS

Soviet Inventions Illustrated, Derwent Publication Ltd.; Week B 10, Apr. 23, 1979, Section Electrical, abstract no. C1200B/10, RII & SU-A-602 767 (Kaun Poly) 03-21-1978.

Patent Abstracts of Japan, vol. 7, No. 253, Nov. 10, 1983, p. (P-235) (1398); & JP-A-58-137005 (Hitachi Seisakusho K.K.) 08-15-1983.

Patent Abstracts of Japan, vol. 6, No. 79, May 18, 1982, p. P-115 (957); & JP-A-57-017015 (Hitachi Seisakusho K.K.) 01-28-1982.

Microtecnic, No. 3, Oct. 1982, Zurich, CH; M. Suzuki "The New Hob Tester Model PCD-50HB", pp. 57-61.

Primary Examiner—Errol A. Krass
Assistant Examiner—Kevin J. Teska
Attorney, Agent, or Firm—Oblon, Fisher, Spivak, McClelland, & Maier

[57] ABSTRACT

A device for measuring the shape of a three-dimensional object comprises a movable arm composed of a plurality of movable arm members and a probe coupled to a forward end of the movable arm by a universal joint. At each of the movable arm members and probe, there is provided an angle-of-rotation encoder for detecting the angle of rotation. In order to measure the shape of the three-dimensional object with a lesser number of measuring times, the probe has a flat surface portion at its forward end which contacts the object. A calculating section calculates the direction of the flat surface portion of the probe in contact with the object, on the basis of the information from the angle-of-rotation encoders and the known information on dimensions of the movable arm, to thereby determine a tangent plane of the object at a contact point between the flat surface portion and the object, and determines the shape of the object from a plurality of tangent planes at the contact points.

8 Claims, 12 Drawing Figures

RECTANGULAR COORDINATE SYSTEM

F I G. 11
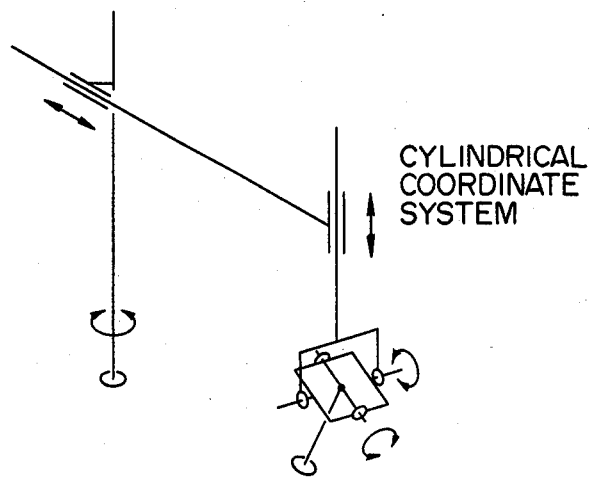
F I G. 12
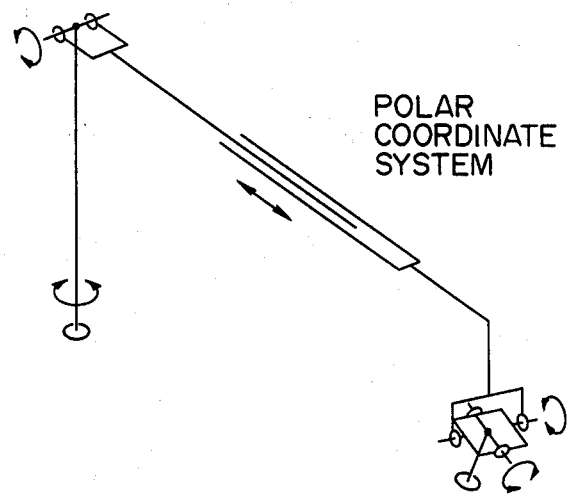

DEVICE FOR MEASURING THE SHAPE OF A THREE-DIMENSIONAL OBJECT

BACKGROUND OF THE INVENTION

1. Field of the Invention

The present invention relates to a device for measuring shapes of three-dimensional objects.

2. Discussion of Background

In, for example, a manufacturing plant, when a product such as a machine is automatically assembled, a device for automatically discriminating the shape of three-dimensional objects such as machine parts becomes necessary for selecting suitable parts among them. Conventionally, in order to discriminate the shape of three-dimensional objects, each object is regarded as a polyhedron, and the position of each vertex (the intersection of three or more adjacent planes) of the polyhedron is measured to determine each plane, to approximately determine the shape of the object on the basis of the space surrounded or defined by such planes. With this method, where the object is a polyhedron, it is possible to precisely discriminate the shape of that object. However, where the object to be measured has a curved surface, since no clear vertex is found on that surface, a measurement is made of the positions of points in the proximity of the object surface to approximately determine the shape of the object from the positions of those points. In this case, therefore, the problem arises that errors in measurement are great. In addition, the method of measuring the positions of the vertexes of the object has a drawback in that the measurement time increases.

Japanese Laid-Open Patent Publication No. 55-55210 discloses a device for measuring a three-dimensional curved surface. The device is equipped with a movable arm having a given number of arm members which are coupled in tandem by joints. The movable arm also has a probe at the forward end of the foremost arm member. In this device, the angle-of-rotation data pertaining to each joint is collected, while moving the probe on the curved surface of the object to thereby determine the three-dimensional surface thereof. However, when this device is applied to the measurement of the shape of a three-dimensional object, the times of measurements unavoidably increases.

SUMMARY OF THE INVENTION

An object of the present invention is to provide a measuring device which can easily measure, with high precision, the shape of a three-dimensional object.

Another object of the present invention is to provide a measuring device arranged to directly measure a tangent plane passing through a given point on the surface of a three-dimensional object, thereby to determine the shape of the object on the basis of a plurality of tangent planes.

A measuring device of the present invention comprises a movable arm having a plurality of movable arm members coupled in tandem by joints; a probe mounted on a forward end of the movable arm by a universal joint for contacting the three-dimensional object to be measured, the probe having at its forward end a flat surface portion which contacts the three-dimensional object; angle-of-rotation encoder means for detecting the angles of rotation of the movable arm members and the probe during the measurement; and means for computing the direction of the flat surface portion of the probe at the contact point between the object and the flat surface of the probe on the basis of information from the angle-of-rotation encoder means and information on dimensions of the movable arm members, to thereby determine a tangent plane, and determining the shape of the object from a plurality of the tangent planes at the contact points.

BRIEF DESCRIPTION OF THE DRAWINGS

FIGS. 10 to 12 show various coordinate systems of the movable arm used for calculating tangent planes of a three-dimensional object.

DETAILED DESCRIPTION OF THE PREFERRED EMBODIMENT

Figure 1:
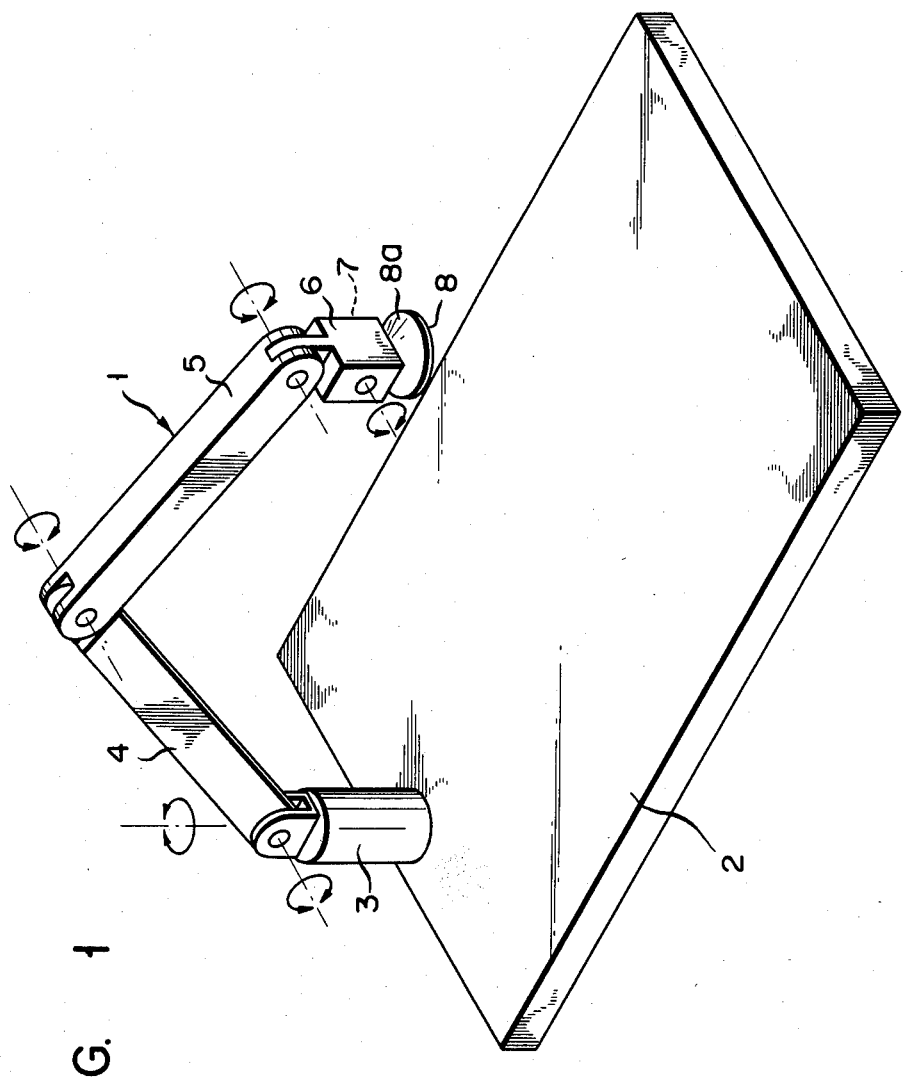
FIG. 1 is a schematic perspective view of a device for measuring the shape of a three-dimensional object according to an embodiment of the present invention.

In a device for measuring the shape of a three-dimensional object according to an embodiment of the present invention, as shown in FIG. 1, a movable arm 1 is mounted on a base 2. On this base 2, a three-dimensional object, the shape of which is to be measured, is placed. The movable arm 1 comprises a supporting column 3 mounted on the base 2 in such a manner that it is rotatable in a plane parallel to the plane of the base 2, a first arm member 4 having its one end supported on the top of supporting column 3 to be swingable in a direction perpendicular to the surface of the base 2, a second arm member 5 having its one end supported on the other end of the first arm member 4 to be swingable in the same direction as the first arm member 4, and a third arm member 6 having its one end supported on the other end of the second arm member 5 to be swingable in the same direction as the first and second arm members 4 and 5. On the forward end of the third arm member 6, a probe 8 is mounted through a probe supporting member 7 in such a manner that it is three-dimensionally swingable with respect to the third arm member 6. The probe 8 is formed, at its forward end, with a flat surface portion 8a perpendicular to the axis of the probe 8. In other words, the probe 8 is coupled to the third arm member 6 by way of a universal joint. The probe 8 is utilized in such a manner that its flat surface portion 8a contacts a three-dimensional object to determine a tangent plane of this object.

Figure 2:
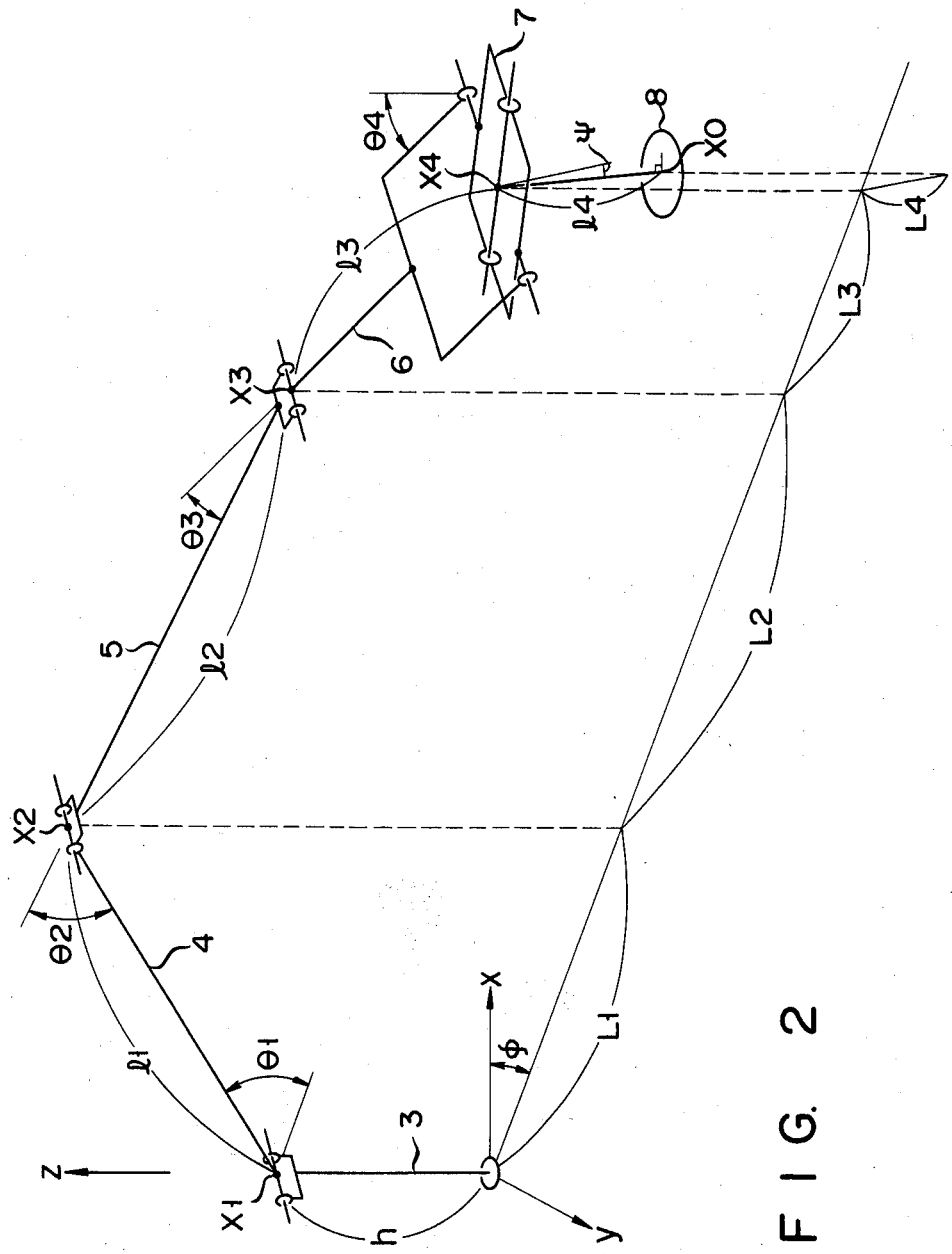
FIG. 2 is a view which serves to explain the method of measuring the shape of a three-dimensional object by using the device shown in FIG. 1.

In the above-mentioned device, the x-y-z space, which is referenced to the surface of the base 2, is defined as shown in FIG. 2. That is to say, when the three-dimensional object is measured, it is assumed that an angle of rotation, as defined with respect to the X axis, of the supporting column 3 provided in the Z-axial direction perpendicular to the plane (x-y), which is defined by the surface of the base 2, is $\phi$. The first arm member 4 rotates through an angle of $\theta 1$ with respect to the plane (x-y) about the center X1 of rotation of a joint located at the height h of the supporting column 3. The second arm member 5 rotates through an angle of $\theta 2$ with respect to the first arm member 4 about the center X2 of rotation of a joint between the first arm member 4 and the second arm member 5. The third arm member 6 rotates through an angle of $\theta 3$ with respect to the second arm member 5 about the center X3 of rotation of a joint between the second arm member 5 and the third arm member 6. The probe supporting member 7 is mounted on the third arm member 6 to be swingable about a position X4. When the probe supporting member 7 rotates with respect to the third arm member 6, the probe 8 rotates through an angle of $\theta 4$ with respect to the Z axis in the plane in which the arm members 4, 5 and 6 rotate. Further, the probe 8 also rotates through an angle of $\psi$ with respect to the plane in which each arm member rotates. The first, second and third arm members 4, 5 and 6 have lengths of l1, l2 and l3, respectively. The flat surface portion 8a of the probe 8 is provided at a position X0, which is spaced by a distance of l4 from the center X4 of the probe supporting member 7. It will be understood that the probe 8 can be directed in any direction by way of the universal joint. Although not shown, an angle-of-rotation encoder such as a potentiometer which is intended to detect the angle of rotation is coupled to each rotating shaft of the supporting column 3, arm members 4, 5 and 6, and probe supporting member 7.

Figure 3:
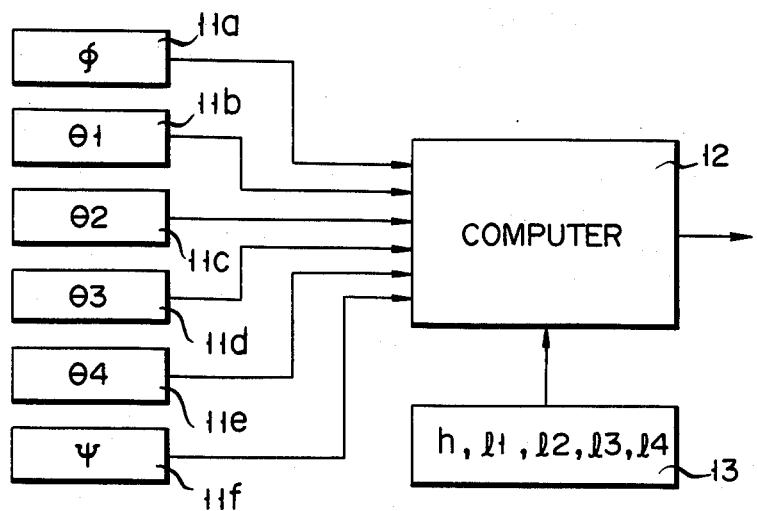
FIG. 3 is a block diagram for measuring the shape of a three-dimensional object.

Hereafter, a description will be made of how to determine tangent planes of a three-dimensional object by using the above-mentioned device. As shown in FIG. 3, information from the angle-of-rotation encoders 11a to 11f to detect the angles of rotation $\phi$, $\theta 1$, $\theta 2$, $\theta 3$ and $\theta 4$ is supplied to a computer 12 which receives, from a register 13, the known data h, l1, l2, l3 and l4 of the above-mentioned movable arm and computes the center position X0 of the probe 8 contacted with the three-dimensional object and the angle of a tangent plane thereof at the contact point (X0) of the flat surface portion 8a or the probe 8 with the object.

When it is now assumed that the coordinates of Xi are expressed in the form of (xi, yi, zi), the coordinates of X1 can be expressed as follows:

x1=0
y1=0
z1=0

The coordinates of X2 can be expressed as follows:

$$x2 = l1\ \cos\theta 1 \cdot \cos\phi + x1$$
$$y2 = l1\ \cos\theta 1 \cdot \sin\phi + y1$$
$$z2 = l1\ \sin\theta 1 + z1$$

Similarly, the respective coordinates of X3, X4 and X0 can be expressed as follows:

$$\begin{cases} x3 = l2 \cos(\theta 1 - \theta 2) \cos\phi + x2 \\ y3 = l2 \cos(\theta 1 - \theta 2) \sin\phi + y2 \\ z3 = l2 \sin(\theta 1 - \theta 2) + z2 \end{cases}$$
$$\begin{cases} x4 = l3 \cos(\theta 1 - \theta 2 - \theta 3) \cos\phi + x3 \\ y4 = l3 \cos(\theta 1 - \theta 2 - \theta 3) \sin\phi + y3 \\ z4 = l3 \sin(\theta 1 - \theta 2 - \theta 3) + z3 \end{cases}$$
$$\begin{cases} x0 = l4 \cos\alpha \cos(\phi + \beta) + x4 \\ y0 = l4 \cos\alpha \sin(\phi + \beta) + y4 \end{cases}$$

$$z0 = l4 \sin\alpha + z4$$

where $$\alpha = \sin^{-1}\{\cos\psi \sin(\theta 1 - \theta 2 - \theta 3 - \theta 4)\}$$

and $$\beta = \tan^{-1}\{\tan\psi / \cos(\theta 1 - \theta 2 - \theta 3 - \theta 4)\}$$

Accordingly, the coordinates of the center position X0 of the flat surface portion 8a of the probe 8 can be calculated from the above as follows:

$$x0 = l4 \cos\alpha \cos(\phi + \beta) + \{l3 \cos(\theta 1 - \theta 2 - \theta 3) + l2 \cos(\theta 1 - \theta 2) + l1 \cos\theta 1\} \cos\phi$$

$$y0 = l4 \cos\alpha \sin(\phi + \beta) + \{l3 \cos(\theta 1 - \theta 2 - \theta 3) + l2 \cos(\theta 1 - \theta 2) + l1 \cos\theta 1\} \sin\phi$$

$$z0 = l4 \sin\alpha + l3 \sin(\theta 1 - \theta 2 - \theta 3) + l2 \sin(\theta 1 - \theta 2) + l1 \sin\theta 1 + h$$

The normal line of the tangent plane of the object at the contact point (X0) of the probe 8 with the object is inclined at an angle of $(\phi + \beta)$ with respect to the X axis in the plane (x-y) and also is upwardly inclined at an angle of $\alpha$ with respect to the plane (x-y). Accordingly, the tangent plane can be expressed as follows:

$$(x+x0) \cos\alpha \cos(\phi+\beta) + (y+y0) \cos\alpha \sin(\phi+\beta) + (z+z0) \sin\alpha = 0$$

By sequentially determining the tangent planes of the object, it is possible to effectively determine the shape of the object which is enclosed by a plurality of measured tangent planes. Finally, the shape of the object is defined by a space which is expressed as follows:

$$a1x + b1y + c1z \leq d1$$

$$a2x + b2y + c2z \leq d2$$

.

.

.

$$anx + bny + cnz \leq dn$$

$$z \geq 0$$

Figure 4:
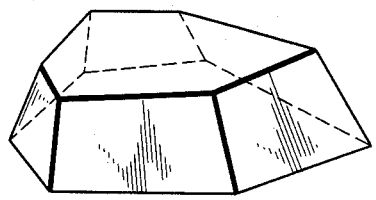
FIG. 4 shows a polyhedral three-dimensional object, the shape of which is easy to measure.
Figure 5:
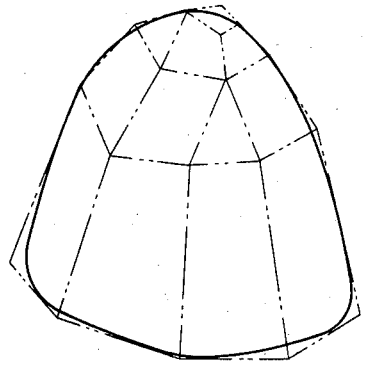
FIGS. 5 and 6 are views for explaining the measuring operation performed with respect to the three-dimensional curved surface of an object to be measured.
Figure 6:
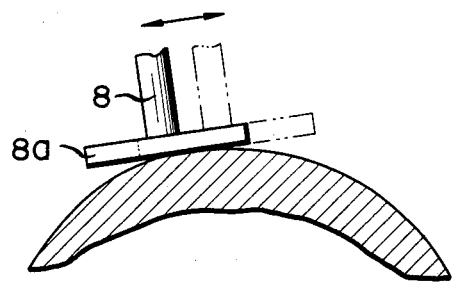

As shown in FIG. 4, where the object is a polyhedron, it is possible, as apparent from the foregoing description, to precisely determine its shape with a lesser number of measuring times. Where an object has a curved surface as shown in FIG. 5, it is possible to relatively precisely determine its shape by expressing the curved surface by a plurality of tangent planes. In this case, even when the flat surface portion 8a of the probe 8 is moved parallel as shown in FIG. 6, the measuring error is very small because no variation occurs in the angle of the tangent plane.

As will be clear from the foregoing description, according to the shape measuring device of the present invention, it is possible to measure the shape of an object consisting of a polyhedron constituted by polygonal planes, with an appreciably lesser number of measuring times than in the case of measuring each vertex of the object. Yet, since each tangent plane is directly determined, factors causing the production of errors involved are small in number.

Figure 7:
FIG. 7 shows a modification of the foremost end of the probe.
Figure 8:
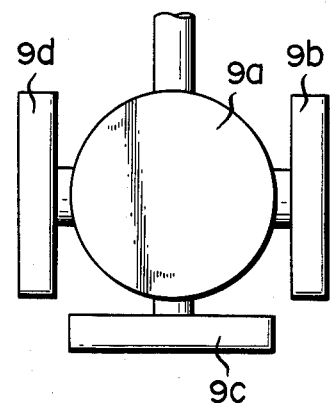
FIG. 8 shows a modification of the probe.
Figure 9:
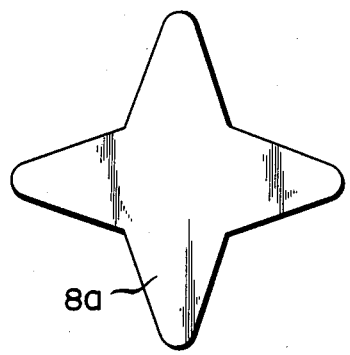
FIG. 9 shows a modification of the flat portion of the probe.
Figure 10:
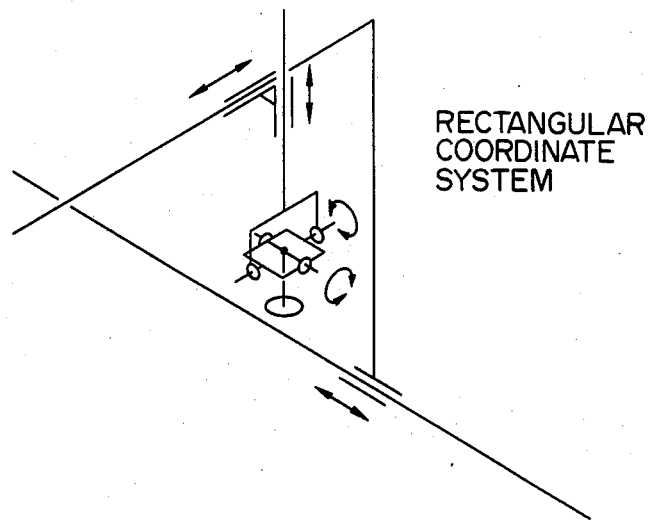

The present invention is not limited to the above-mentioned embodiment. For example, the construction (the number of the arm members, etc.) of the movable arm supporting the probe 8 and the latitude with which this movable arm can be moved, may be determined in accordance with the specification involved. Measuring a tangent plane of a concave surface is also possible by making the flat surface portion 8a of the probe small. Modifications of this invention will be described. As shown in FIG. 7, the flat portion 8a of the probe 8 need not be provided perpendicular to the axis of the probe 8. Since the constant angle between the flat portion 8a of the probe 8 and the axis of the probe 8 is known in advance, the angle may be compensated for calculating tangent planes of the three-dimensional object. As shown in FIG. 8, the probe 8 may be provided with a plurality of flat portions 9a, 9b, 9c, 9d and so on for ease of measurement. In this case, switch means may be provided for switching the flat portions of the probe to measure a tangent plane of the object. The flat portion of the probe need not be shaped into a circle, but may be shaped into a polygonal, ellipse, or star. In FIG. 9, the flat portion is shaped into a star. The movable arm need not be provided with rotatable joints. The movable arm may be designed to contract and expand, or slide. In this case, encoder means may be provided for measuring the arm length or the slide position to calculate tangent planes of an three-dimensional object. The coodinate system of the movable arm used in calculating the tangent planes may be a rectangular coordinate system as shown in FIG. 10, a cylindrical coordinate system as shown in FIG. 11, or a polar coordinate system as shown in FIG. 12.

What is claimed is:

1. A device for measuring the shape of a three-dimensional object comprising:
    a movable arm having a plurality of movable arm members coupled in tandem by joints;
    a probe coupled to the forward end of said movable arm by a universal joint, said probe adapted for contacting the three-dimensional object, the shape of which is to be measured, and said probe being rotatable and having at its forward end a flat surface portion which is provided perpendicular to an axis of said probe and which contacts said three-dimensional object;
    angle-of-rotation encoder means for detecting the angles of rotation of said probe and said movable arm members during the measurement of the shape of the three-dimensional object; and
    calculating means for calculating, on the basis of information from said angle-of-rotation encoder means and the dimensions of said movable arm, the orientation of said flat surface portion of said probe in contact with the three-dimensional object, to thereby determine a tangent plane at the contact point between said flat surface portion and said three-dimensional object, and determining the shape of the three-dimensional object from a plurality of tangent planes at contact points between said flat surface portion of said probe and said object.

2. A device for measuring the shape of a three-dimensional object, comprising:
    a base on which a three-dimensional object, the shape of which is to be measured, is placed;
    a supporting column provided vertically on a plane of said base to be rotatable in the plane of said base;
    a movable arm mounted on one end of said supporting column and having a plurality of arm members coupled in tandem by joints, each of said arm members being arranged to be rotatable in a plane perpendicular to the plane of said base;
    a probe coupled to a forward end of said movable arm by a universal joint, said probe being rotatable and having a flat surface portion which is provided perpendicular to an axis of said probe and which contacts the three-dimensional object to be measured;
    angle-of-rotation encoder means for detecting angles of rotation of said probe, said supporting column, and said movable arm members; and
    calculating means for calculating, on the basis of the rotation-angle information from said angle-of-rotation encoder means and the known dimensions of said supporting column, said movable arm and said probe, the orientation of said flat surface portion of said probe contact with the three-dimensional object, to thereby determine a tangent plane at the contact point between said flat surface portion and the three-dimensional object, and for determining the shape of the three-dimensional object from a plurality of tangent planes at contact points between said flat portion and object.

3. A device according to claim 2, in which said probe has a plurality of flat portions, one of said flat portions being selectively used in calculating the tangent plane.

4. A device according to claim 2, in which said flat portion of said probe is circular.

5. A device according to claim 2, in which said flat portion of said probe is star-shaped.

6. A device according to claim 2, in which said calculating means uses a rectangular coordinate system in determining the tangent plane of the three-dimensional object.

7. A device according to claim 2, in which said calculating means uses a cylindrical coordinate system in determining the tangent plane of the three-dimensional object.

8. A device according to claim 2, in which said calculating means uses a polar coordinate system in determining the tangent plane of the three-dimensional object.

* * * * *